United States Patent

Bhagavatula et al.

[11] Patent Number: 5,984,747
[45] Date of Patent: Nov. 16, 1999

[54] GLASS STRUCTURES FOR INFORMATION DISPLAYS

[75] Inventors: Venkata A. Bhagavatula, Big Flats; Benjamin J. Garbowski, Horseheads; Chad B. Moore, Corning; Donald M. Trotter, Jr., Newfield, all of N.Y.

[73] Assignee: Corning Incorporated, Corning, N.Y.

[21] Appl. No.: 08/810,960

[22] Filed: Feb. 27, 1997

Related U.S. Application Data

[60] Provisional application No. 60/014,432, Mar. 28, 1996.

[51] Int. Cl.$^6$ .................................................. H01J 9/02
[52] U.S. Cl. ........................................ 445/24; 313/582
[58] Field of Search .................. 445/24, 25, 35; 313/582, 584

[56] References Cited

U.S. PATENT DOCUMENTS

| | | |
|---|---|---|
| 3,130,757 | 4/1964 | Schellack .................................. 445/35 |
| 3,602,754 | 8/1971 | Pfaender et al. ....................... 445/24 X |
| 4,183,125 | 1/1980 | Meyer et al. ............................... 445/24 |
| 4,896,149 | 1/1990 | Buzak et al. . |
| 5,036,317 | 7/1991 | Buzak . |
| 5,077,553 | 12/1991 | Buzak . |
| 5,229,685 | 7/1993 | Kim et al. ............................... 313/584 |
| 5,272,472 | 12/1993 | Buzak . |
| 5,313,223 | 5/1994 | Buzak et al. . |
| 5,551,903 | 9/1996 | Kumar et al. ............................. 445/24 |
| 5,725,406 | 3/1998 | Togawa .................................... 445/24 |

*Primary Examiner*—Kenneth J. Ramsey
*Attorney, Agent, or Firm*—Maurice M. Klee; Robert L. Carlson; Angela N. Nwaneri

[57] ABSTRACT

Rib structures for containing plasma in electronic displays are formed by redrawing glass preform into fiber-like rib components. The rib components are then assembled to form rib/channel structures suitable for use in flat panel displays, such as plasma emissive displays, field emissive displays and plasma addressed liquid crystal displays.

48 Claims, 15 Drawing Sheets

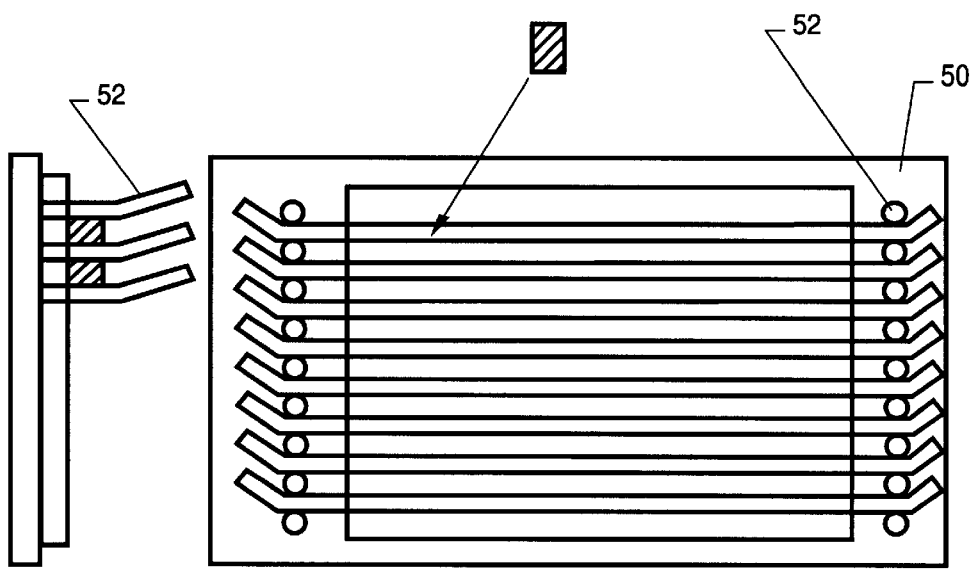
FIG. 11a
FIG. 11
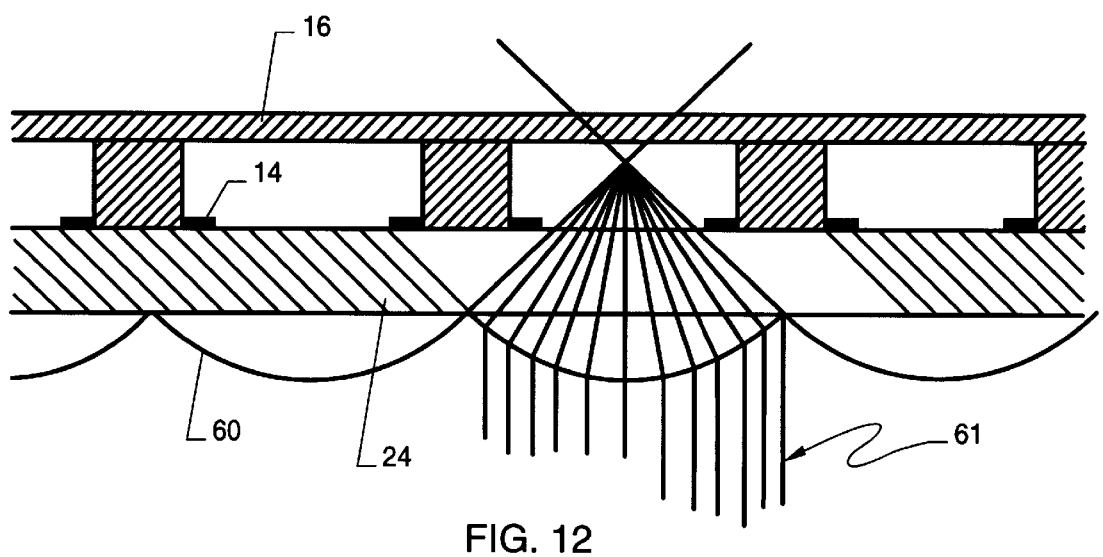
FIG. 12

GLASS STRUCTURES FOR INFORMATION DISPLAYS

This application claims the benefit of U.S. Provisional Application No. 60/014,432, filed Mar. 28, 1996.

BACKGROUND OF THE INVENTION

Tektronix, Inc., has disclosed and demonstrated the use of plasma channels to address a liquid crystal display. For example, U.S. Pat. Nos. 4,896,149, 5,036,317, 5,077,553, 5,272,472, 5,313,423, the specifications of which are all hereby incorporated by reference, disclose such structures. This technique, which provides an active addressing matrix suitable for high-line-count displays, competes with the thin-film transistor (TFT) active matrix approach commercialized by a number of Japanese companies. Plasma addressing panels are thought to be easier than TFT panels to manufacture in large sizes. The plasma addressing technology was licensed to Sony in 1993; Sony recently announced plans to commercialize 25" plasma-addressed liquid crystal (PALC) displays under the name "Plasmatron".

The PALC display, illustrated in FIG. 1, relies on the highly non-linear electrical behavior of a relatively low pressure (10–100 Torr) gas, usually He, confined in many parallel channels. A pair of parallel electrodes 14 are deposited in each of the channels 12, and a very thin glass microsheet 16 forms the top of the channels. Channels 12 are defined by ribs 15, which are typically formed by screen printing or sand blasting. A liquid crystal layer 18 on top of the microsheet 16 is the optically active portion of the display. A cover sheet 20 with transparent conducting electrodes 22 running perpendicular to the plasma channels 12 lies on top of the liquid crystal 18. Conventional polarizers, color filters, and back lights, like those found in other liquid crystal displays, are also commonly used.

When voltages are applied to the transparent electrodes, because there is no ground plane, the voltages are divided among the liquid crystal, the microsheet, the plasma channel, and any other insulators intervening between the transparent electrode and whatever becomes the virtual ground. As a practical matter, this means that if there is no plasma in the plasma channel, the voltage drop across the liquid crystal will be negligible, and the pixels defined by the crossings of the transparent electrodes and the plasma channels will not switch. If, however, a voltage difference sufficient to ionize the gas is first applied between the pair of electrodes in a plasma channel, a plasma forms in the plasma channel so that it becomes conducting, and constitutes a ground plane. Consequently, for pixels atop this channel, the voltages will be divided between the liquid crystal and the microsheet only. This places a substantial voltage across the liquid crystal and causes the pixel to switch, thus, igniting a plasma in the channel causes the row above the channel to be selected. Because the gas in the channels is non-conducting until a well-defined threshold voltage between the electrode pair is reached, and then becomes conducting, the rows are extremely well isolated from the column voltages unless selected. This high non-linearity allows very large numbers of rows to be addressed without loss of contrast.

The PALC display relies on the use of a thin microsheet to separate the plasma from the liquid crystal. This microsheet should be as thin as possible (e.g. 1.5–2 mils), with as high a dielectric constant as possible, to minimize the voltage drop across it. Current manufacturers plan to utilize a single, monolithic piece of microsheet for this purpose, e.g., D-263 microsheet of 30–50 $\mu$m thickness manufactured by Schott. However, large sheets of microsheet are difficult to manufacture, causing the availability of large, thin microsheet to be a potential limitation on the size of the PALC displays that can be manufactured. In addition, the barrier ribs in such displays commonly have quite high aspect ratios (7 mils height to 1.5 mils wide). In the past, the channels between these ribs have been made by etching into a glass substrate or by building up walls of glass on a substrate by deposition processes such as screenprinting. The technique employing etching of the channels results in channels having rounded bottoms. Techniques employing building up material to form walls result in non-vertical side walls. Both of these conditions adversely affect light transmission through the panel.

Another type of electronic information display is the plasma emissive display. In plasma emissive displays, light is emitted to create the information image to be displayed. Typically, this involves initiating an electrical discharge in a gas mixture containing Xe. The discharge ionizes the gas atoms, releasing ultraviolet radiation which strikes a phosphor, causing the phosphor to emit visible light. Where color is desired, phosphors which emit red, blue and green light upon being struck by the ultraviolet energy are used.

Several companies have demonstrated both DC and AC plasma emissive displays and several of these displays have been sold into the market place. However, to date Fujitsu Limited is the only company that is manufacturing and selling large area (e.g. 21 inch and 42 inch diagonal) color displays. One of the difficulties encountered with the manufacture of these displays is the making of the barrier rib structures, which typically are on the order of 100–130 microns high. To date such barrier rib structures are made by building up about 10–16 silk screened layers (each layer being about 10 microns or less thick), after which the structure is fired. Holding the dimensional tolerances of the multi-step silk screening process while forming the barrier ribs and maintaining alignment with the address electrode and the three phosphor layers is very difficult and only becomes more impractical as the display sizes get larger.

It would therefore be desirable to develop a more simple and robust manufacturing process for making barrier structures for use in electronic displays, which enables the formation of more accurate barrier structures having flat, vertical walls.

SUMMARY OF THE INVENTION

One aspect of the present invention relates to a method of making barrier rib structures for use in electronic information display devices, in which glass preforms are redrawn into smaller diameter fibers, and these drawn fibers are assembled to form a rib/channel structure suitable for use in an electronic display. The fibers can be shaped to have a cross-sectional shape selected from the group consisting of T-shaped, U-shaped, L-shaped, H-shaped, I-shaped, trapezoidal, or rectangular or any combination of the above shapes. Alternatively, the fibers can be drawn so that they comprise a plurality of hollow channels in each fiber. If desired, an electrode material such as a wire or a fusible metal can be inserted into the fiber during the redraw step. For example, in T-shaped or I-shaped fibers the electrode material could be deposited into opposite sides of a wall of the fiber. The method of the present invention is particularly useful for forming rib and channel structures suitable for retaining a plasma, such as in a plasma address liquid crystal display, a plasma emissive display, or a field emission display (FED).

Another aspect of the invention involves a structure for use in an electronic display comprising a plurality of small diameter glass fibers assembled into a rib/channel structure suitable for use in an electronic display. The rib/channel structures of the present invention are particularly useful for retaining plasmas which are produced during operation of electronic displays, e.g. plasma addressed liquid crystal displays or plasma emissive displays.

BRIEF DESCRIPTION OF THE DRAWINGS

FIG. 11 illustrates an alternative method for aligning ribs to form rib/channel structures in accordance with the invention.

FIG. 12 illustrates the use of lenses to improve the performance of a display in accordance with the invention.

DETAILED DESCRIPTION OF THE INVENTION

Figure 2:
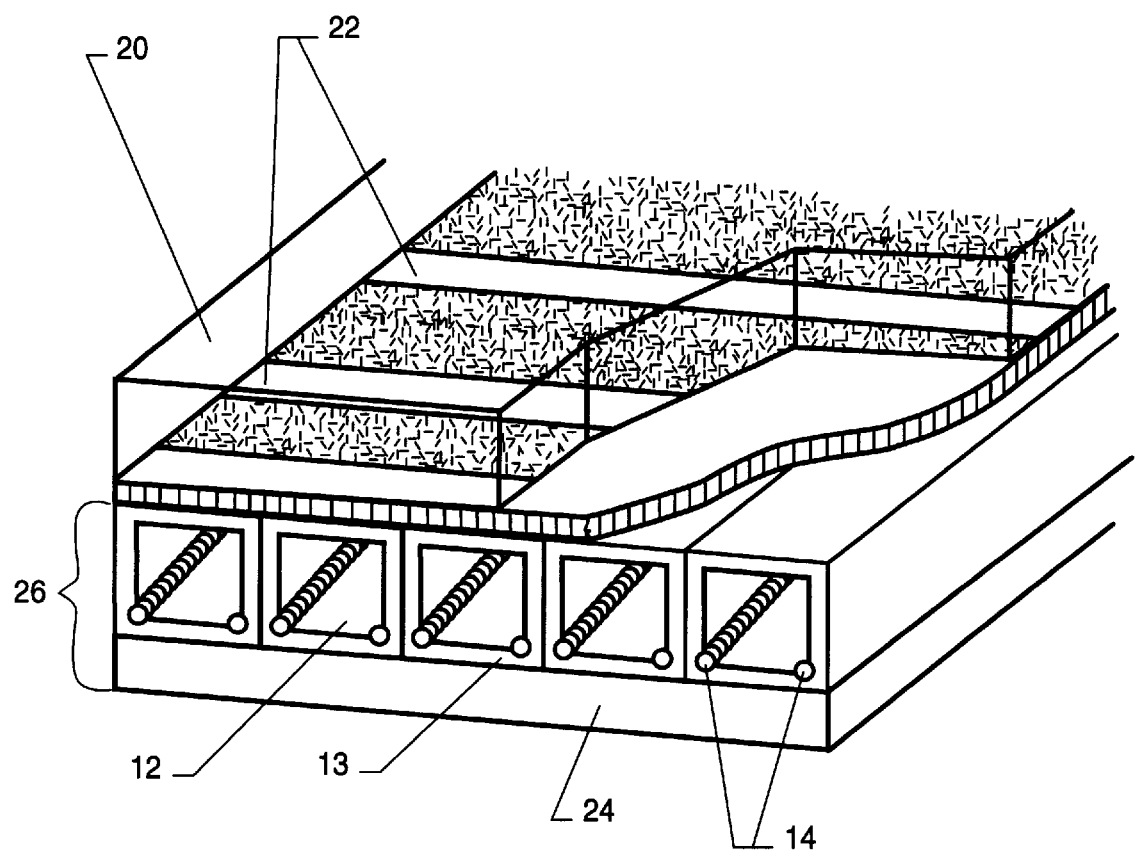
FIG. 2 illustrates a plasma addressed liquid crystal display in accordance with the present invention.
Figure 3A:
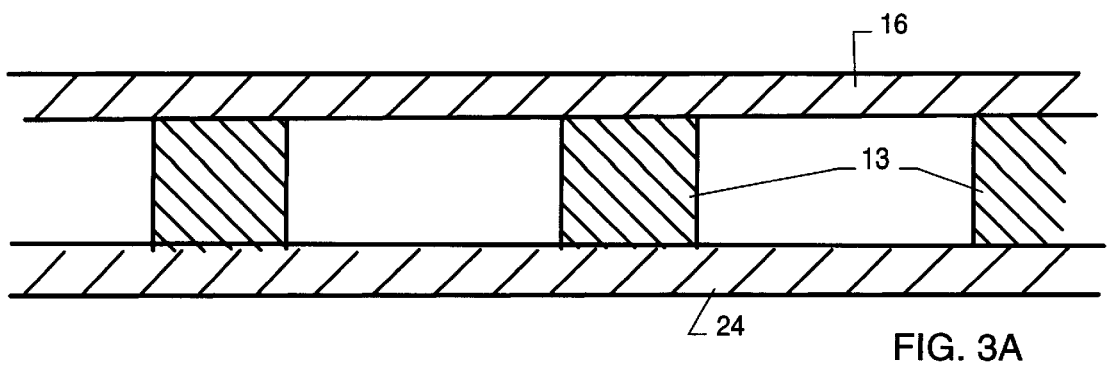
FIGS. 3A through 3D illustrate various rib/channel structures in accordance with the present invention.
Figure 3B:
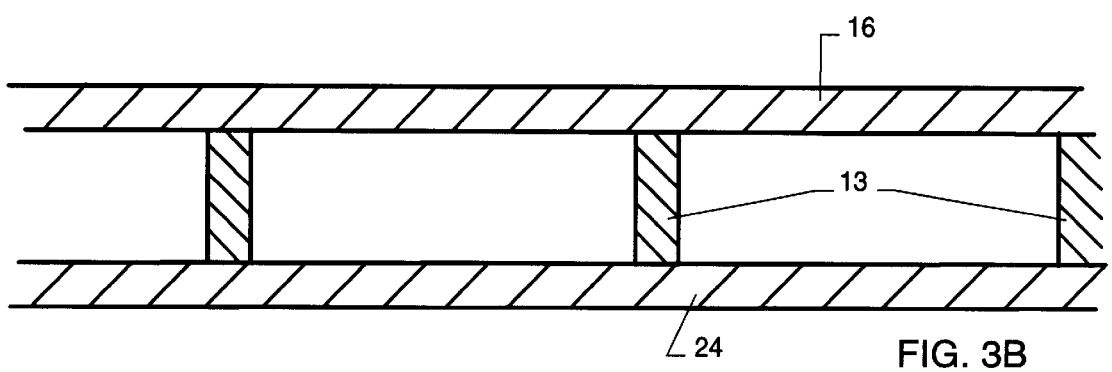
Figure 3C:
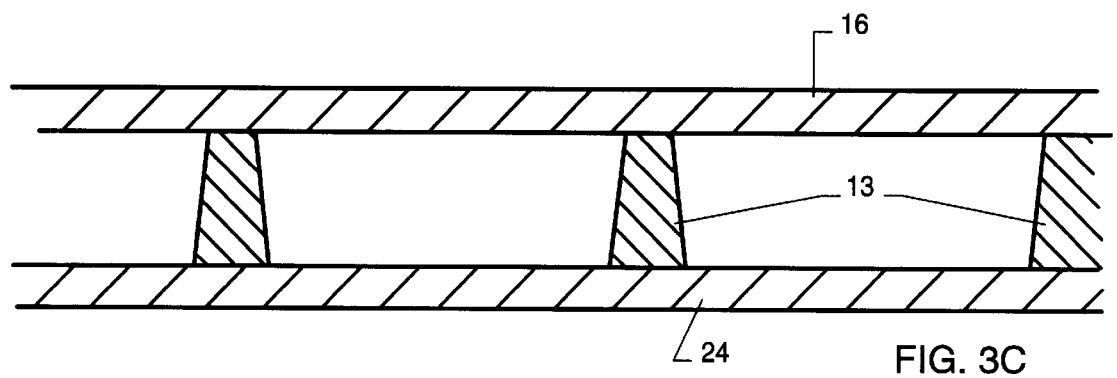
Figure 3D:
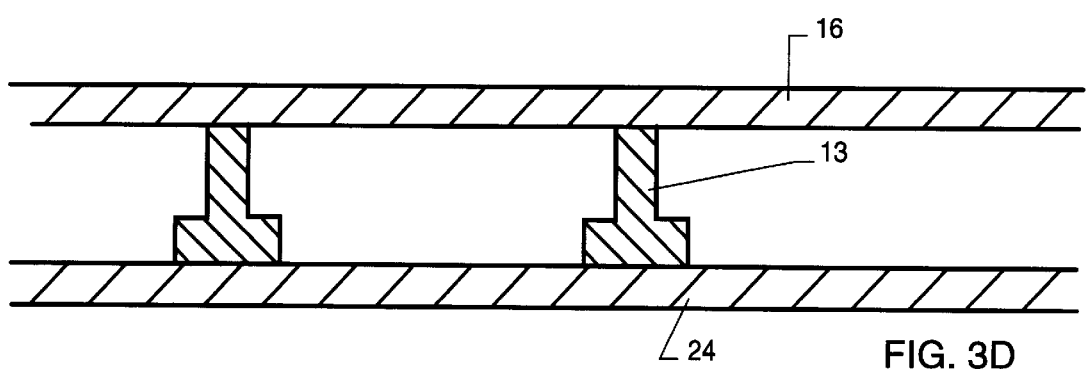

In the invention, glass structures for displays are formed by drawing fiber 13 from an appropriately-shaped glass preform (as illustrated in and as will be further discussed with reference to FIG. 8) and assembling the fiber 13 to form an array 26 (for example, as illustrated in FIG. 2). By glass structures, it is meant that the present invention may be used, for example, to form the channels 12 and other structures needed or commonly employed in electronic displays. FIG. 2 illustrates the formation of channels 12 in a PALC display by employing square or rectangular glass fibers 13 arrayed on glass substrate 24. Electrodes 14 are employed in the corners of each channel 12. Alternatively, the fibers 13 may be used to define the side walls of the channels, and a microsheet cover 16 utilized to complete the channels. As illustrated in FIGS. 3A–3D, many cross sectional shapes of fiber 13 may be utilized for this purpose. This may simplify manufacturing by enabling more than one correct orientation, one of which may be more or less desirable for one reason or another (e.g. comparative robustness).

Figure 4A:
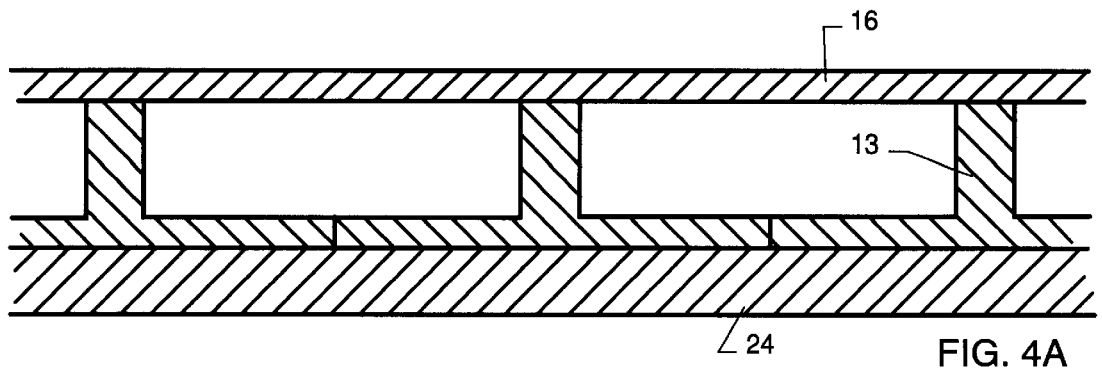
FIGS. 4A through 4D illustrate alternative rib/channel structures.
Figure 4B:
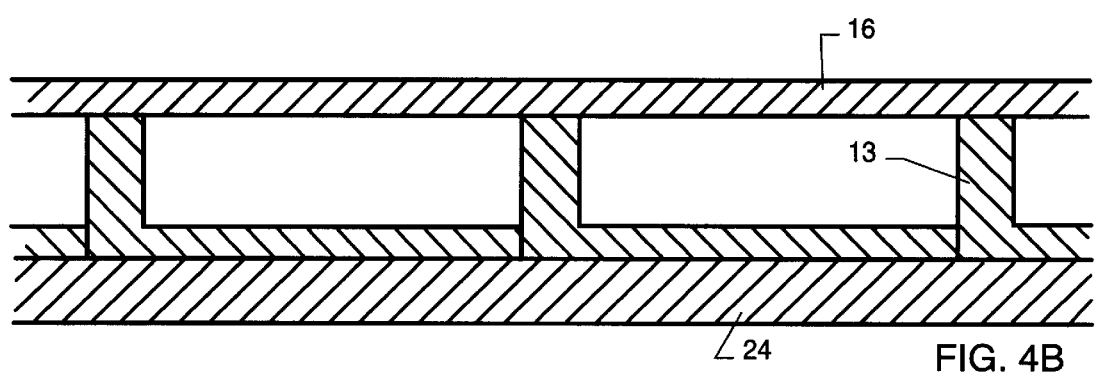
Figure 4C:
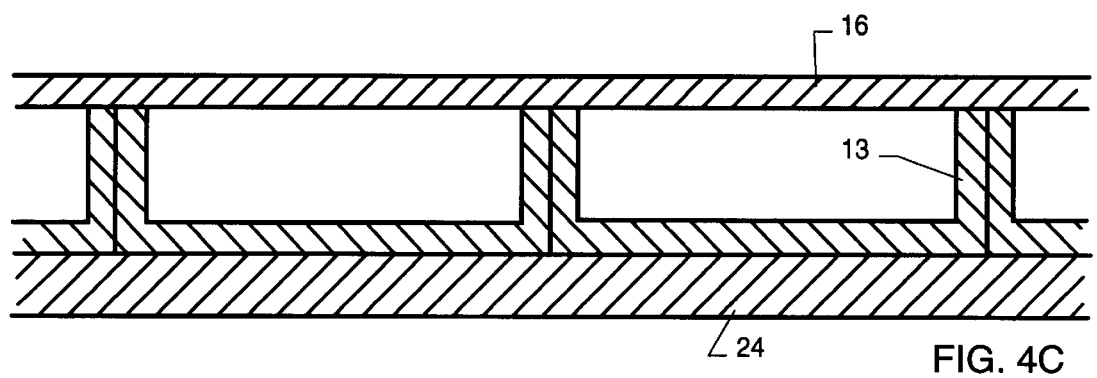
Figure 5:
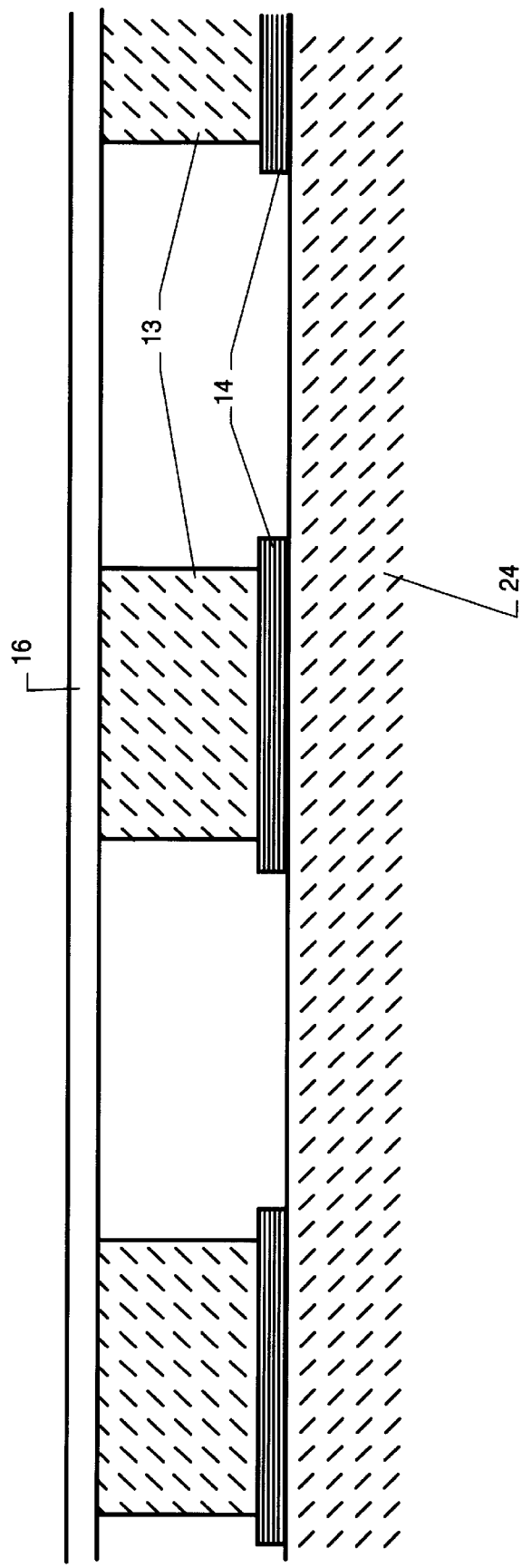
FIG. 5 illustrates a rib structure deposited over an electrode which is first deposited onto a glass substrate.

Fiber for the ribs may be produced by a fiber draw process as will be discussed further below. The cross section of the fiber may be round, as in optical waveguide fiber, or it can be square, rectangular, trapezoidal, or T-shaped, as illustrated in FIGS. 3A–3D, respectively. In FIGS. 3A–3D, the fiber 13 is used to form ribs which support the microsheet cover 16 of the PALC and separate the plasma channels from each other. The space between the substrate 24 and the microsheet 16 is under reduced pressure (40–80 Torr), so it is desirable that the top of the fiber/rib 13 be flat and smooth to provide better support. Only light which passes through the clear aperture between the ribs reaches the viewer. Since the center-to-center pixel spacing is fixed, this implies that the ribs should be as narrow as possible, so that rectangular ribs would be preferred. However, rectangular ribs may tend to lie flat when placed on the substrate, so a square, trapezoidal, or t-shape may be more practical. T-shaped fibers which abut along the channel mid-line, as illustrated in FIG. 4A, would provide a convenient means of maintaining the correct center-to-center spacing of the ribs if the line along their contact did not result in an unacceptable optical defect. Abutting U-shaped or L-shaped fibers 13, as illustrated in FIGS. 4B & 4C, respectively, would maintain the correct center-to-center spacing and additionally, the line of contact between adjacent fibers would not be in the clear apertures of the panel. These approaches are expected to improve the aperture ratio of the panel compared to prior art methods. The precise dimensional control of the fibers 13 could allow them to be placed on previously deposited electrodes 14 common to two channels, as illustrated in FIG. 5; this would improve the aperture ratio of the panel and halve the number of interconnections required. The fibers 13 may also constitute the microsheet cover 16 plus the side walls; this would offer improved aperture ratio and eliminate handling of large microsheet.

Figure 4D:
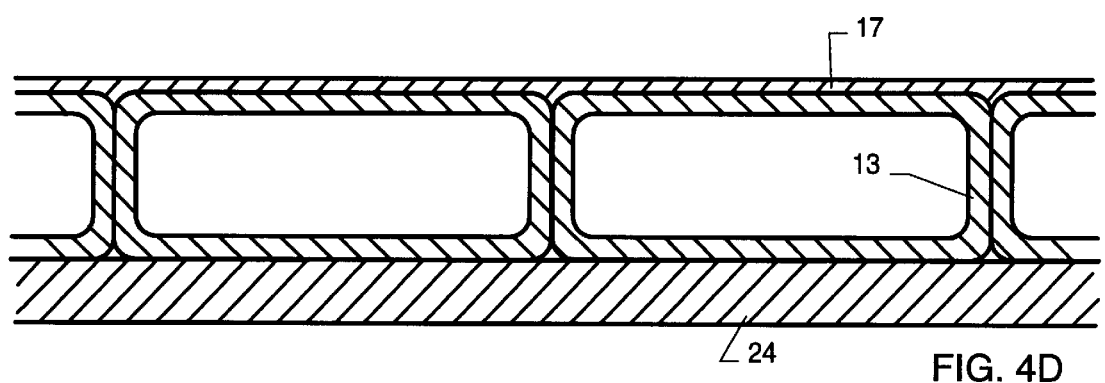

The fibers 13 may also be drawn as closed channels, as illustrated in FIG. 4D, or groups of closed channels. This diminishes the difficulty of forming and handling very large lengths of very thin glass. In addition, the glass membrane through which the plasma communicates electrically with the liquid crystal can be made significantly thinner (15 $\mu$m has been demonstrated, and thinner is certainly feasible) than monolithic microsheet. If needed or desired, a planarizing coating or layer 17 may be employed over the fibers 13. Further, in the prior art methods the cover and substrate sheets are frit sealed together, which places stringent requirements on expansion matching between the three materials (cover, substrate, and frit), and limits the useful glasses. The use of closed channel fibers allows a wider range of glasses to be utilized, in particular glasses having higher dielectric constants and lower helium permeation constants. A thinner membrane made from a glass having a higher dielectric constant reduces the voltage drop across the membrane, and allows a larger proportion of any applied voltage to fall across the liquid crystal. Because it is only the voltage drop across the liquid crystal which is effective in causing the desired switching action, reducing the voltage drop across the membrane reduces the total voltage which must be applied to the display. This in turn allows the use of cheaper, lower-voltage drive circuitry. Glasses having higher dielectric constants are also expected to have lower permeability to helium. A glass having a large proportion of modifiers is expected to have not only a high dielectric constant but also a low permeability to helium. A low helium permeability is desired in a PALC display because diffusion of helium out of the display can limit its useful life.

Figure 6A:
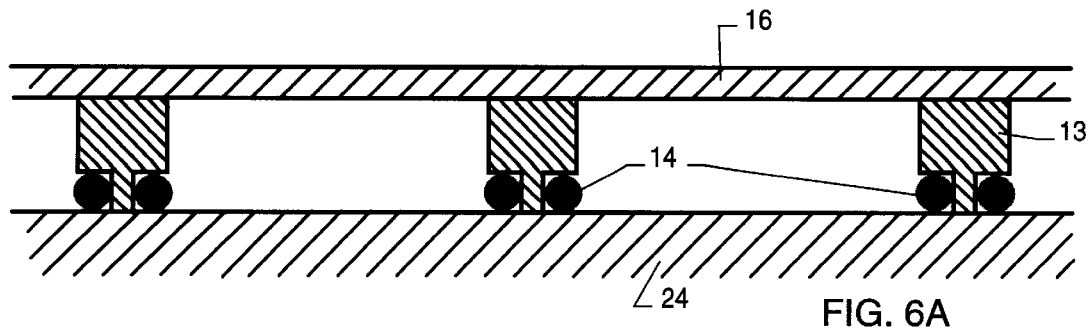
FIGS. 6A through 6E illustrate embodiments utilizing electrodes which are either drawn along with the fiber or incorporated with the fiber onto the substrate.
Figure 6B:
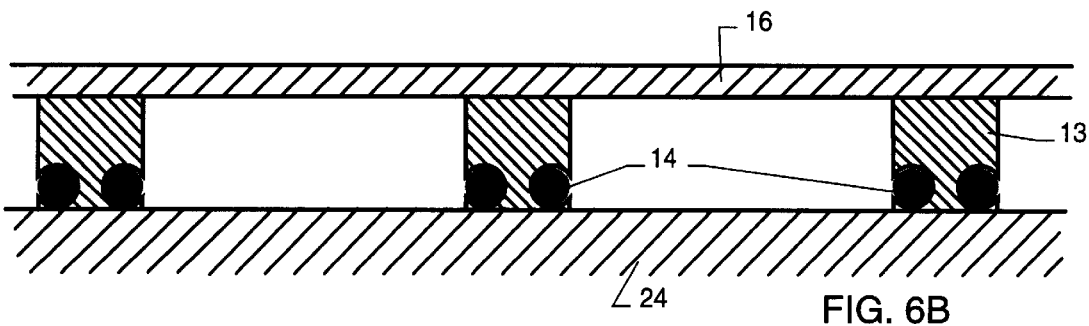
Figure 6C:
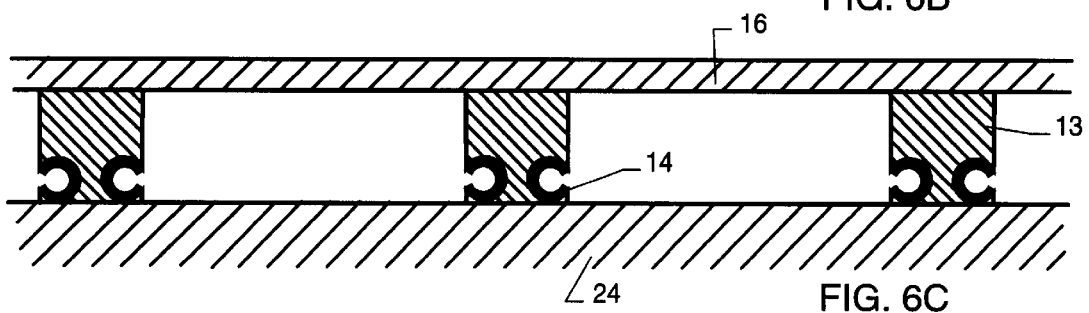
Figure 6D:
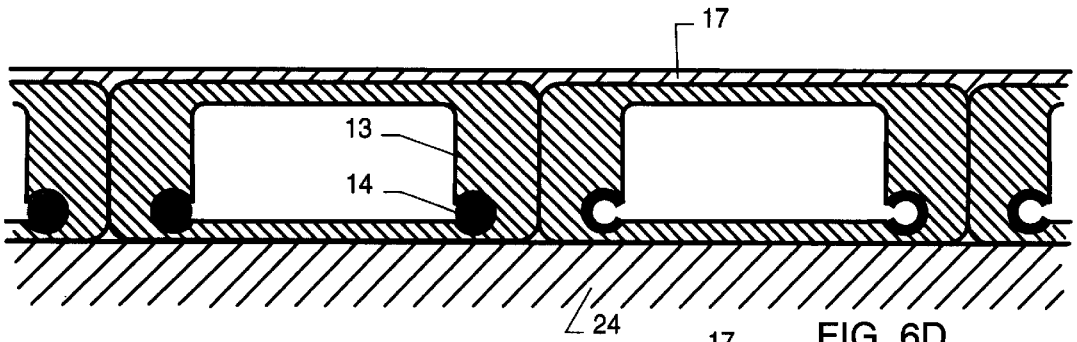
Figure 6E:
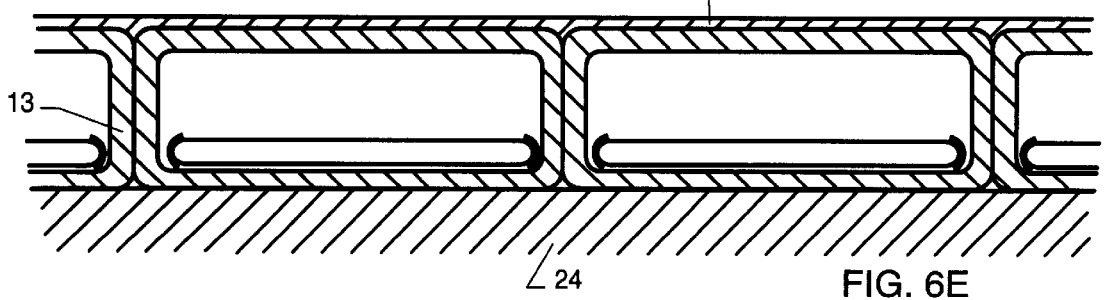
Figure 7:
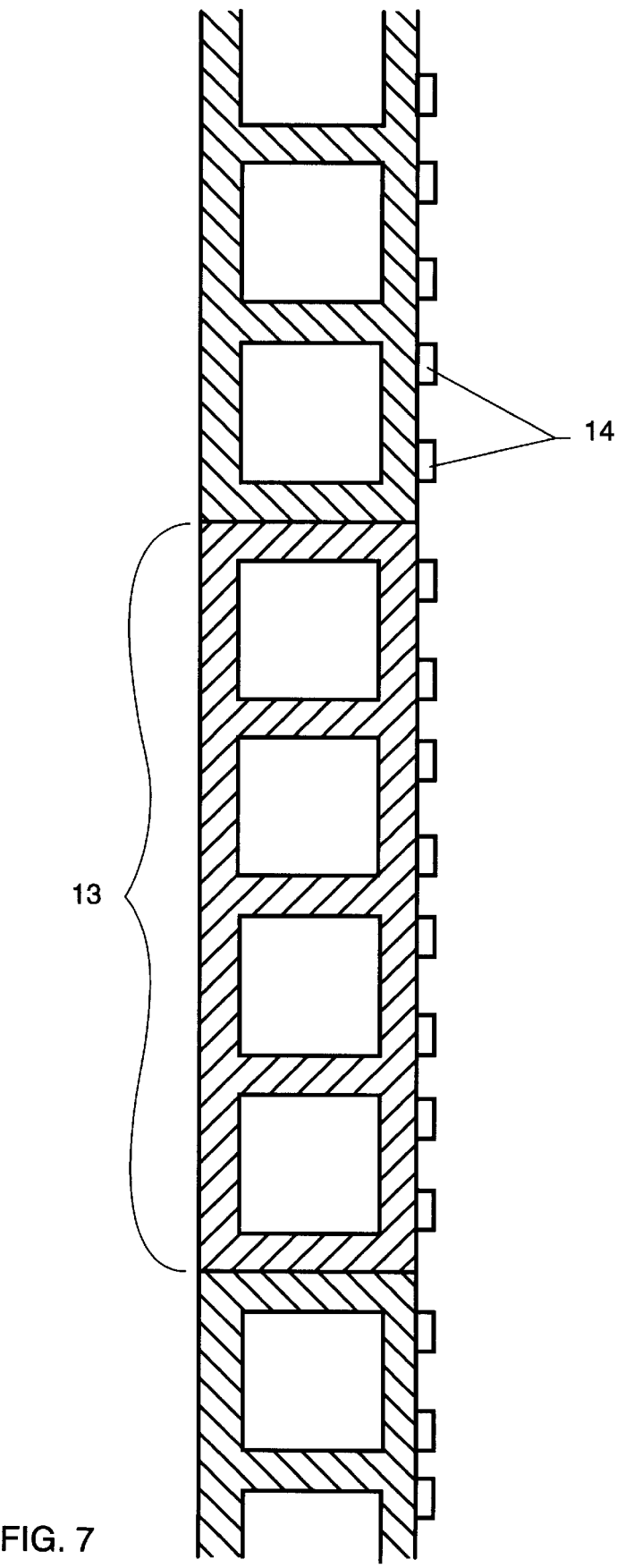
FIG. 7 illustrates a fiber having four rectangular channels.

Another portion of the invention is the incorporation of the electrodes 14 in the fibers as illustrated, for example, in FIGS. 2, and 6A–6E. This may be done, for example, by drawing a wire electrode into the fiber redraw process (as will be discussed further below with respect to FIGS. 8, 16, and 17) by drawing conductive ink by capillary action into recesses in the fibers (as illustrated in FIGS. 6C and 6D) after the fiber draw process, by insertion of wires into recesses (as illustrated in FIGS. 6A and 6B), or by insertion of second, smaller fibers bearing electrodes on both edges (as illustrated in FIG. 6E). As illustrated in FIGS. 6D and 6E, a planarizing layer 17 may be employed if desired. As illustrated in FIG. 7, deposited electrodes 14 may be applied to the exterior surface of thin-walled, closed-channel fibers or groups of fibers 13. Alternatively, the electrodes may be drawn along with the fibers by incorporating into the preform a metal which melts at a temperature below that at which the glass softens, e.g., Al in code 7059 glass. When fiber is drawn from the metal/glass preform, the metal melts and is drawn along with the glass.

Figure 8:
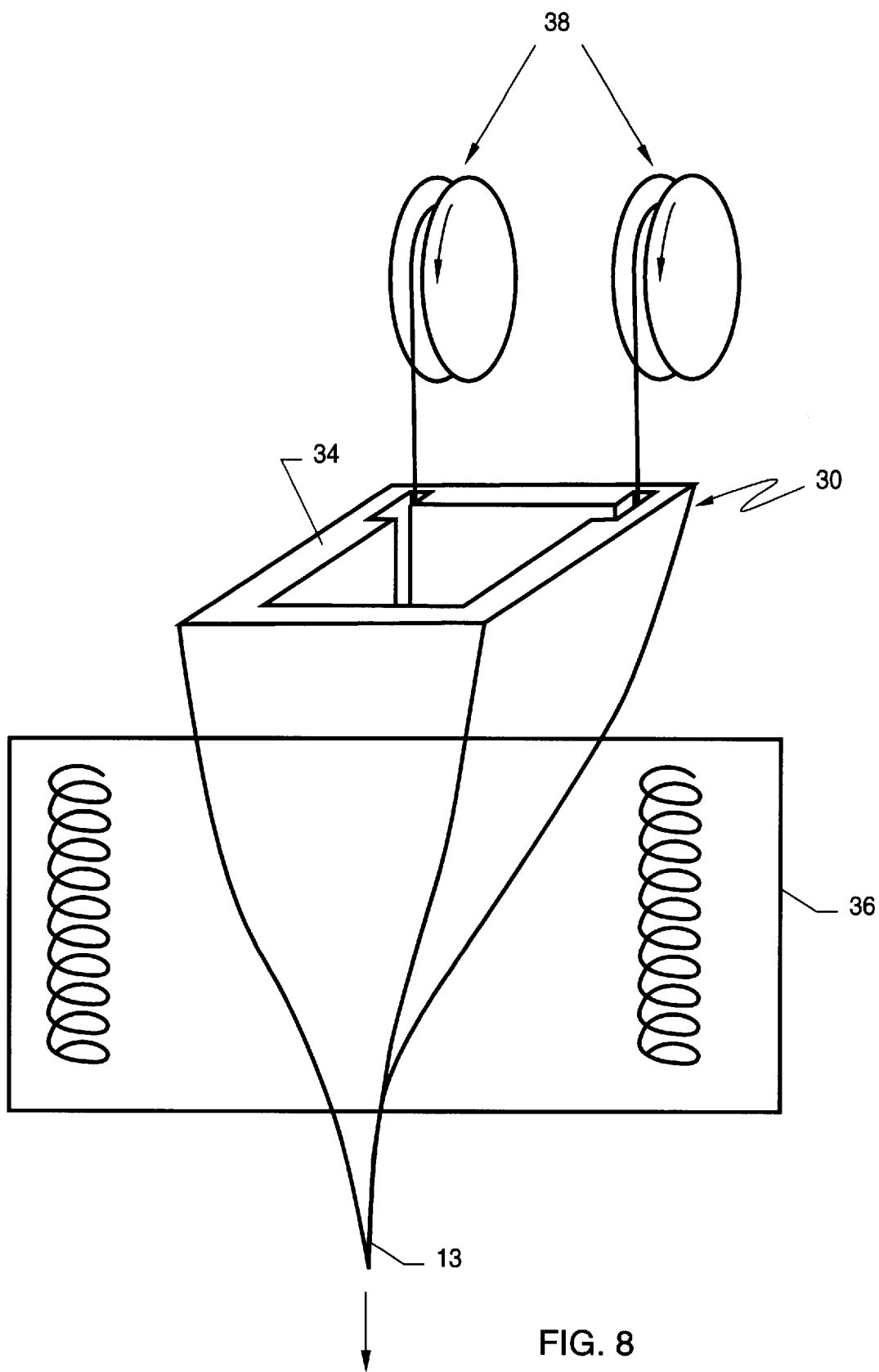
FIG. 8 illustrates a redraw process for making fibers in accordance with the invention.

A preferred method of forming the channel fibers, known as the redraw process, is illustrated in FIG. 8. In this process a glass preform 30 having a relatively large width is drawn down into a thinner and longer shape fiber 13. In this way, the end fiber 13 retains the basic cross-sectional shape 34 of the starting preform 30. The basic forming process is thus similar in some respects to that employed to make optical fiber. However, in the present invention, rather than producing round fibers, the fibers are shaped according to the channel configuration desired. In the redraw process, the preform 30 is fed into a furnace 36, where it is pulled and its diameter can be necked down (known as the root of the draw). In the case of a PALC display, control of the shape of the fiber is facilitated by sealing the upper end of the preform, for example using silicone rubber, and affixing it to a vacuum line connection so that the pressure on the inside could be slightly reduced (typically about one inch $H_2O$). The fiber is then drawn from the furnace and cooled upon reaching the desired smaller diameter fiber 13.

A preferred means of incorporating electrodes in the fibers is by drawing wire electrodes 38 of high-temperature-melting metals (e.g. 0.001–0.003" tungsten wire) along with the fibers 13, as illustrated in FIG. 8. The wires 38 are preferred to deposited thin or thick film electrodes, because they provide much higher electrical conduction. This improves the speed with which very large displays can be addressed. A further advantage of the use of co-drawn wire electrodes is that the glass shrink-fits around the wire, so that the wire is held, but the glass does not bond to it. This eliminates the need to have the glass expansion matched to the electrode. An additional advantage of co-drawing wire is that secondary operations to apply or insert electrodes into the fibers are not required.

Figure 9:
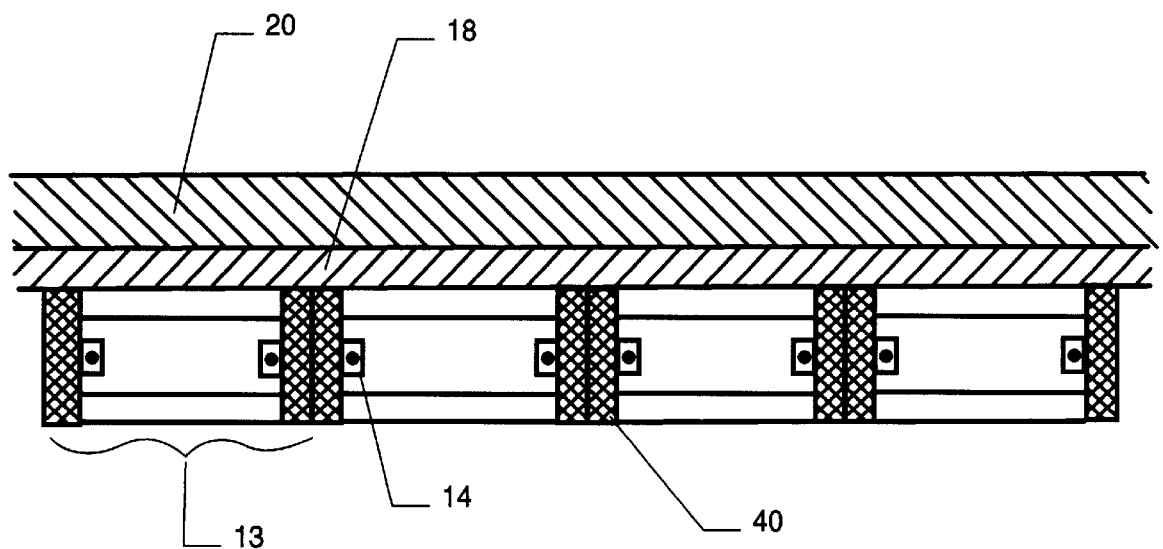
FIG. 9 illustrates the use of optically absorbing ribs to form a black matrix pattern.
Figure 14:
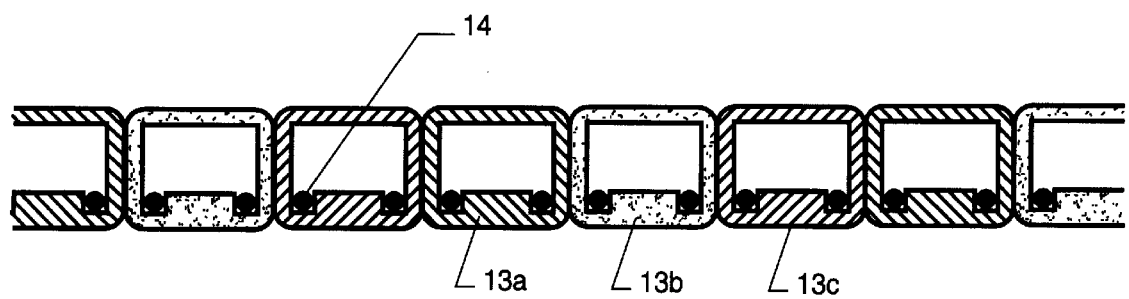
FIG. 14 illustrates the use of colored fibers to produce a color display.

The invention is also directed to the use of fibers made of colored or opal glasses or having colored coatings or phosphors applied during draw. As illustrated in FIG. 14, for example, red fibers 13a, green fibers 13b, and blue fibers 13c can be arrayed in the proper order when the panel is being assembled to form a color filter for PALC displays which is integral to the addressing panel. Additionally, the portions of the preform 30 which draw into the sides of the fibers could be made from optically absorbing glass 40, so that the sides of the resultant drawn fibers 13 are likewise optically absorbing; this would allow the panel assembled from fibers to provide the black matrix function as well as the color filter function, as illustrated in FIG. 9. The separate color filter is one of the most expensive portions of the display, and it would be a considerable advantage to have this function built into the addressing panel. In addition, use of an integral color filter eliminates the problems now associated with maintaining registration between the addressing structure on the lower sheet of a display and the color filter on the upper sheet. The manufacturing process is thus more robust, any variation in fiber diameter, which would result in lateral run out of the panel, produces concomitant run out in the integral color filter, and the quality of the display is unaffected.

Figure 10:
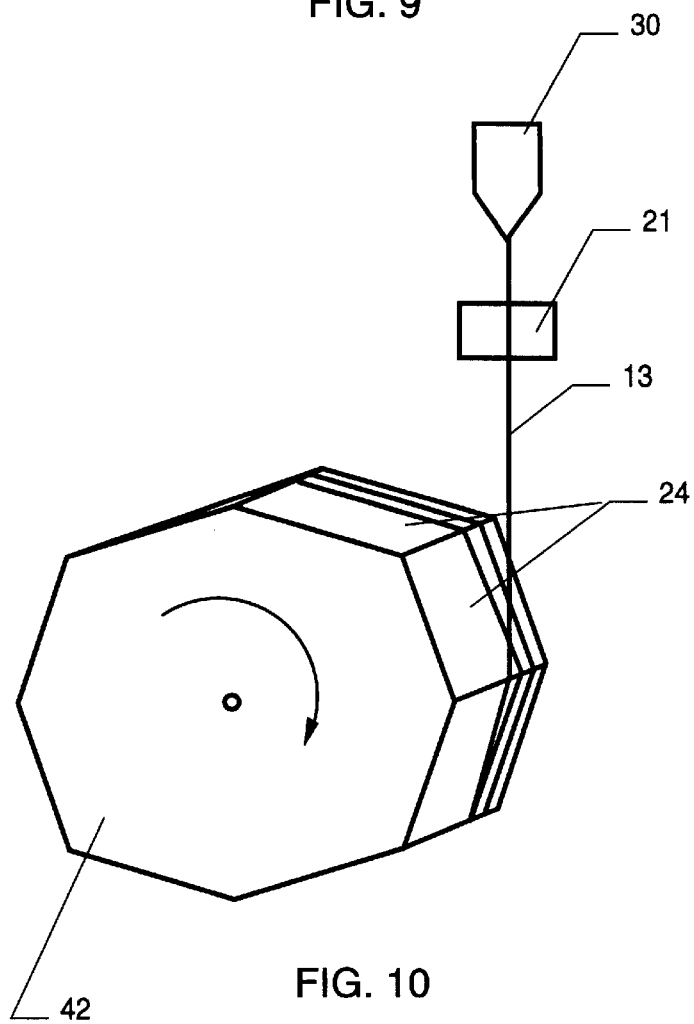
FIG. 10 illustrates a method for aligning fibers onto substrates to form rib/channel structures.

A still yet further portion of the invention involves the means for assembling the panels. This may consist of winding fibers 13 from a preform 30 (such as, for example, a fiber draw process as illustrated in FIG. 8) onto suitable planar substrates or carriers 24 which may also or alternatively be adhesive coated and which are arrayed on a polygonal drum 42, as illustrated in FIG. 10. This winding operation could be carried out at high speed, and the precise dimensional control capability of draw operations combined with the self-aligning features of the present invention eliminate the need for tight external control of fiber position on the drum. An alternative method, illustrated in FIG. 11, makes use of an assembly jig 50 with guide pins 52. The guide pins 52 control the position and orientation of the strips in a very controlled fashion. After placement of these strips, the strips are glued to the substrate with an easily "burnable" epoxy or UV curable acrylate or other suitable material. The proper orientation of long strips can be maintained with the use of the assembly jig and may be enhanced by bending the strip at the end as shown in FIG. 11. The use of planarizing coatings to improve the flatness of the assembled panels may be desirable.

A further embodiment of the invention, illustrated in FIG. 12, which is of particular use in PALC displays, is to shape a portion of the fiber assembly to form cylindrical lenses arrayed parallel to the plasma channels. Some of the problems with scattering of light into other pixels, which causes noise and lowers contrast, can be solved using an array of lenses 60 which is coincident with the plasma channels to image the light to a narrow line so that it passes more readily through the panel. These lenses, which preferably are cylindrical, can be made in a variety of manners. They can be made on the backside of the substrate glass 24 supporting the plasma channels or they can be made separately and attached to the backside of the glass 24. These lens arrays may also be made from chemically machinable glass and attached to the glass substrate. This can also be accomplished by properly shaping one side of fibers constituting the closed plasma channels, or by applying additional fibers or fiber groups to the back of the panel. The shaped fibers focus light, which would ordinarily be blocked, through the panel and increase the brightness of the display.

Finally, if a thin, continuous coating of metal is applied to the preform before fiber draw, it is possible to obtain stretched metal particles on the fiber after the draw, thereby forming a polarizing coating which is formed along with the fiber; this would eliminate the need for a separate polarizer sheet in a PALC display. It might be necessary to hydrogen fire the fibers to reduce the metal if it has oxidized during the draw process.

Figure 1:
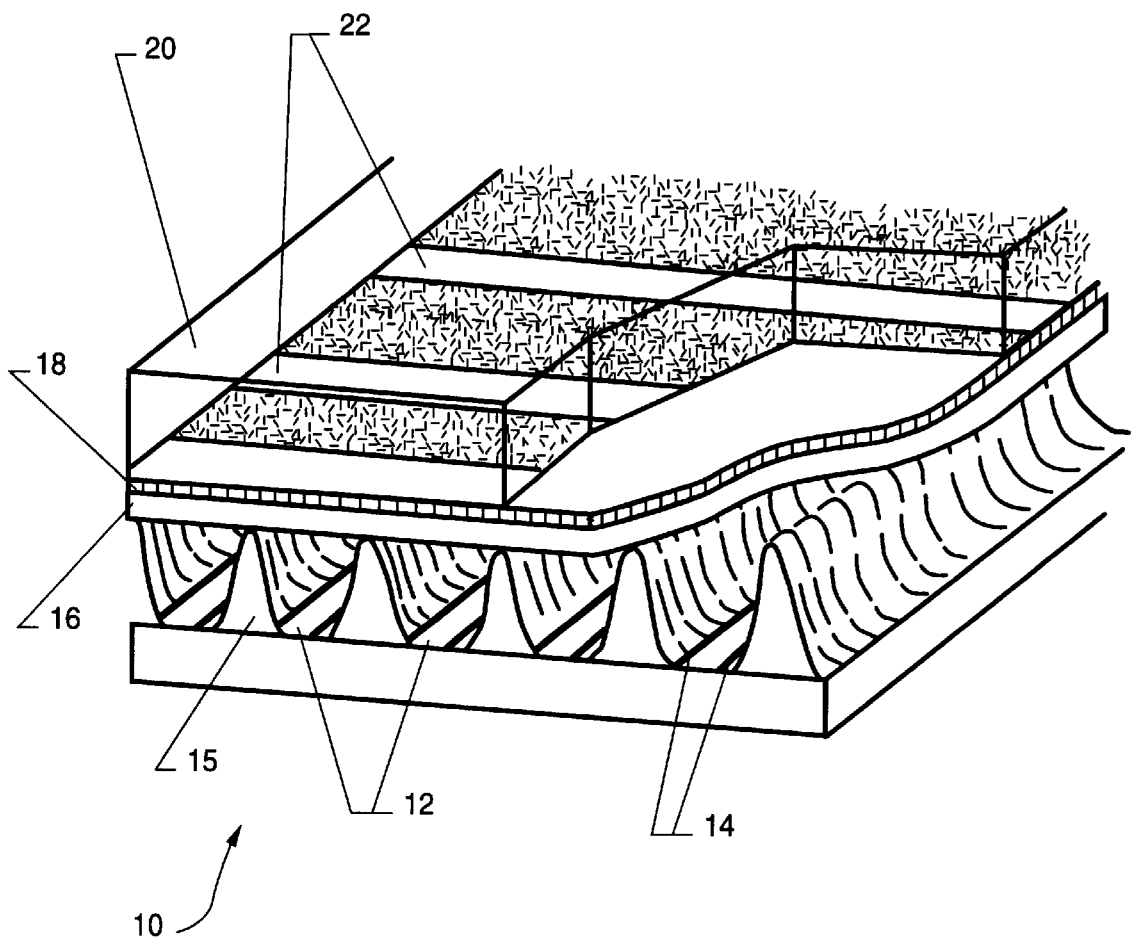
FIG. 1 illustrates a plasma addressed liquid crystal display in accordance with the prior art.
Figure 15:
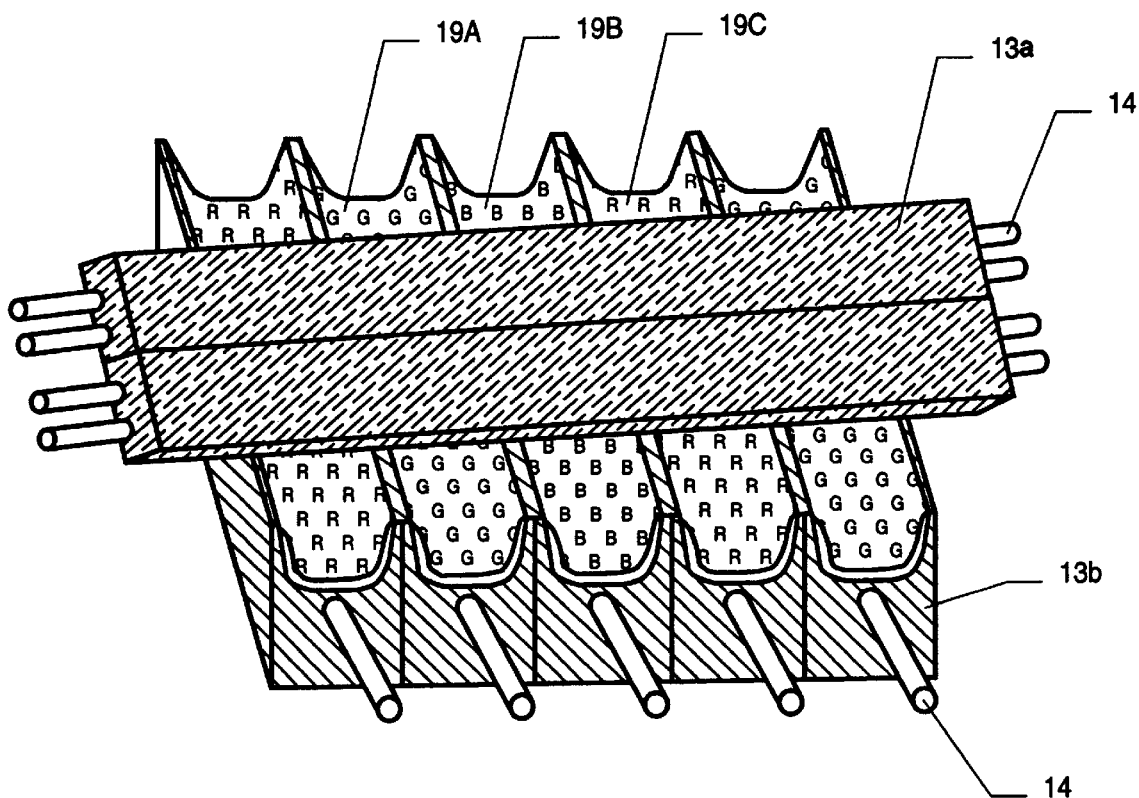
FIG. 15 illustrates a schematic view of a plasma display in accordance with the present invention.

When laid up to form rib arrays, the areas adjacent the ribs form channels which are suitable for use in electronic displays, e.g. to retain a plasma. For example, the channels can be used to retain a plasma in a PALC display, such as is illustrated in FIG. 1, or in a plasma emissive display, such as is illustrated in FIG. 15.

While much of the above description has been directed to PALC displays, many embodiments of the present invention are also applicable to emissive displays, such as, for example, plasma emissive displays or field emission displays (FED's). The invention could be employed to form channels with or without co-drawn wire electrodes as barrier/spacer ribs for such emissive display applications.

Figure 18:
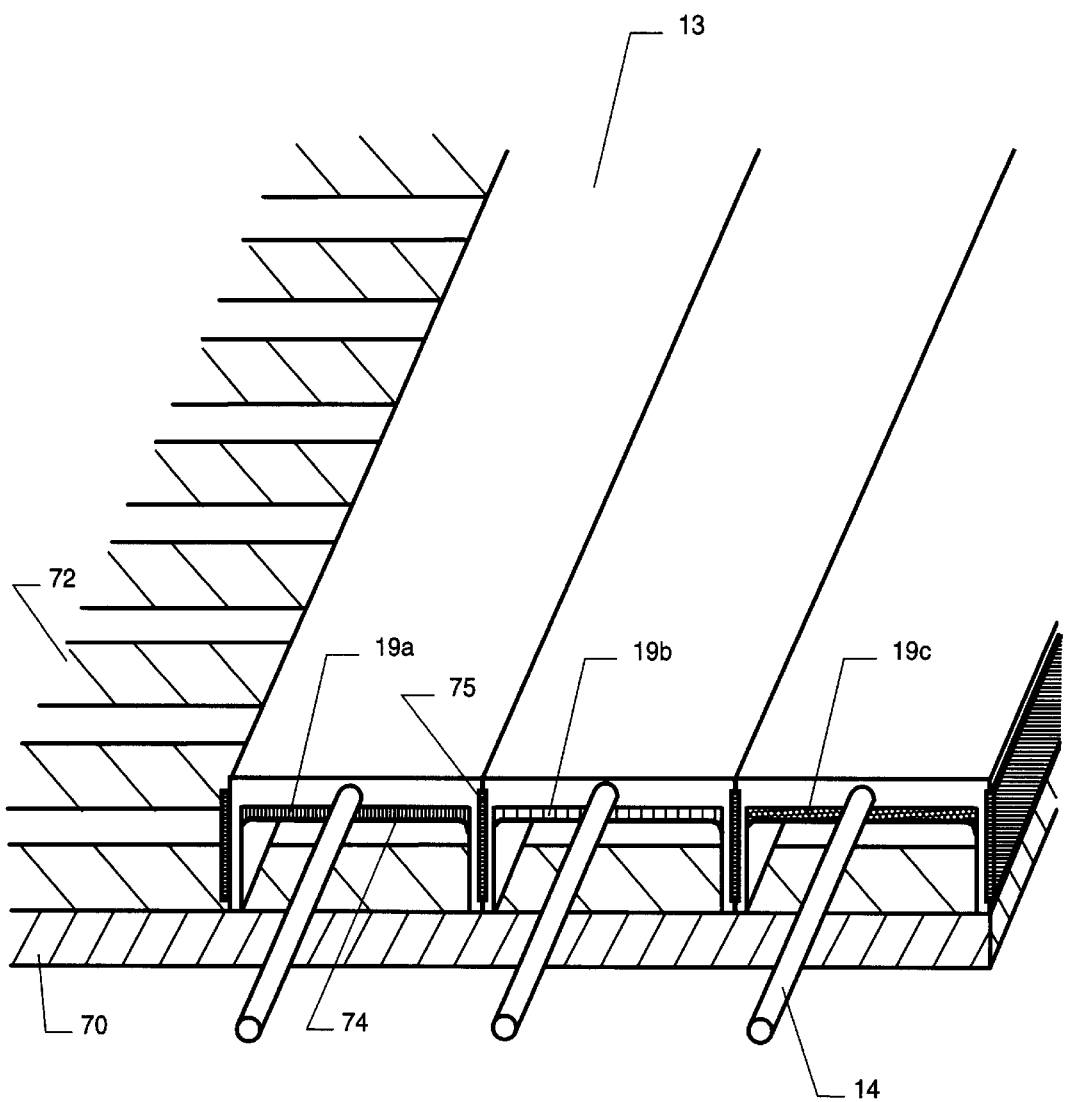
FIG. 18 illustrates a field emission display in accordance with the present invention.

As illustrated in FIG. 18, a typical field emission display in accordance with the invention consists of a bottom glass plate 70 on which diamond-like carbon electrode emitters 72 are deposited. U-shaped fibers 13 are arrayed on top of the glass plate 70 in a direction generally orthogonal to that of the diamond-like carbon electrodes 72. The fibers 13 are coated with red, green and blue phosphors 19a, 19b, and 19c, respectively. Each of the phosphors 19a–19c are coated with an aluminum metal layer 74. The U-shaped fibers 13 are accurately formed so that the walls thereof maintain the gap between the diamond-like carbon electrode emitters 72 and the phosphors 19a–19c. A getter material 75 may be deposited on the side of the fibers 13 if desired to sustain the vacuum in the display.

Any fiber drawn channel geometry that is currently used to produce the barrier ribs and/or spacers for a FED or plasma display could be formed using the methods presented herein. If desired, each fiber could be pulled by a phosphor coater 21 which subsequently coats the channels with the color phosphors like shown in FIG. 10. The phosphors could be coated with a metal such as aluminum to both reflect the light out to the viewer and pull off the charge of an electron beam. The invention also includes the potential use of a getter material, such as barium metal, coated on the channel structure, preferably on side of the channel, to maintain the low vacuum for use in an FED. The sides of the channel could also be drawn from an absorbing/reflecting glass to keep a good color contrast between pixels.

For plasma emissive displays, red, green and blue phosphors can be applied to the fiber channels during the draw process 21. In most embodiments, it is desirable that the fibers be made to be reflecting to reflect as much of the generated light out through the front of the display as possible. Thus, in a preferred embodiment, the fibers are made to be capable of reflecting at least 25 percent, and more preferably at least 50 percent, of the visible generated light. This can be achieved, for example, by fabricating the fiber from a reflecting glass (such as an opal glass) or coating the front or back side of the fiber with a reflecting film to reflect the generated light out through the front of the display. Laying-up fibers having electrodes contained therein and phosphor coatings within each channel also eliminates any problem with maintaining registration. The manufacturing process for this technology would also be more robust, causing any lateral run out caused by variations in fiber diameter to have minimal effect on the quality of the display because the color phosphor and the address electrodes are an integral part of the fiber channel.

FIG. 15 illustrates a plasma display in accordance with the present invention. Top plate fiber 13a and bottom plate fiber 13b are co-drawn with wire electrodes 14 embedded therein. These fibers serve to replace the top and bottom plate structures in the display. Red, green, and blue phosphors 19a, 19b, and 19c, respectively are deposited within the U-shaped channel of bottom plate fibers 13b. These bottom fibers 13b are arrayed orthogonal to the top plate fibers 13a, to complete this basic component of the plasma display.

Figure 16:
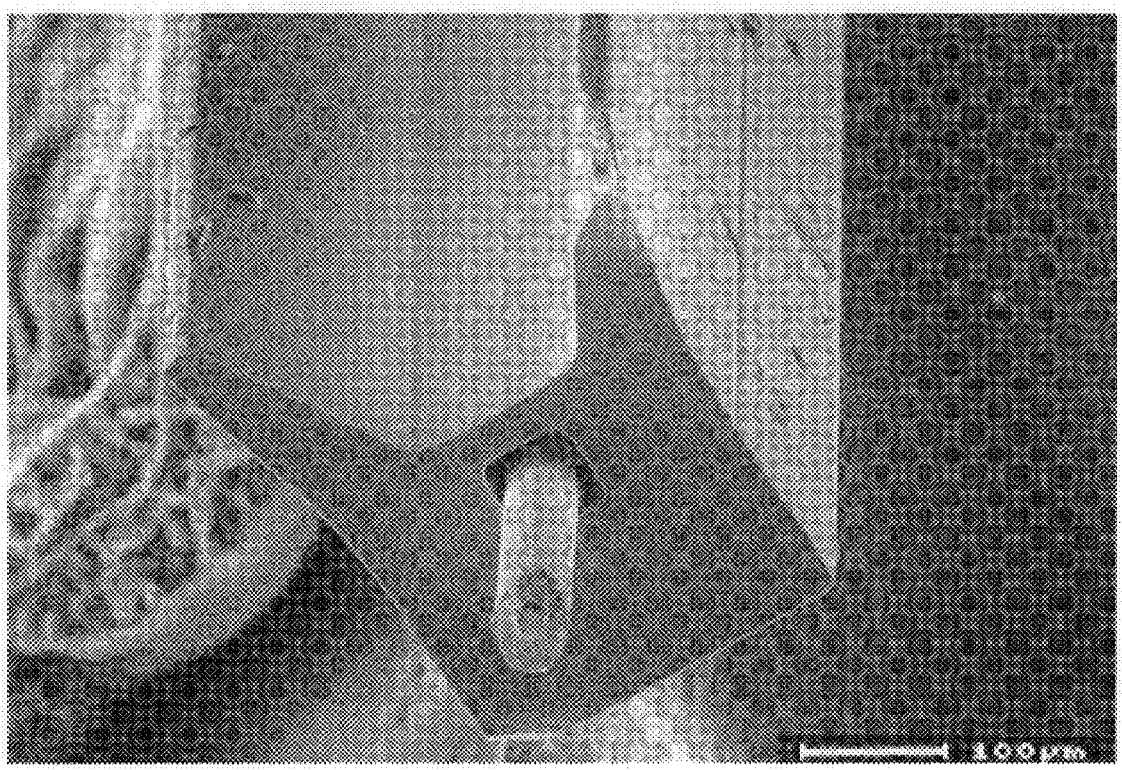
FIG. 16 illustrates a co-drawn wire electrode/fiber which may be used, for example, in a plasma display.
Figure 17:
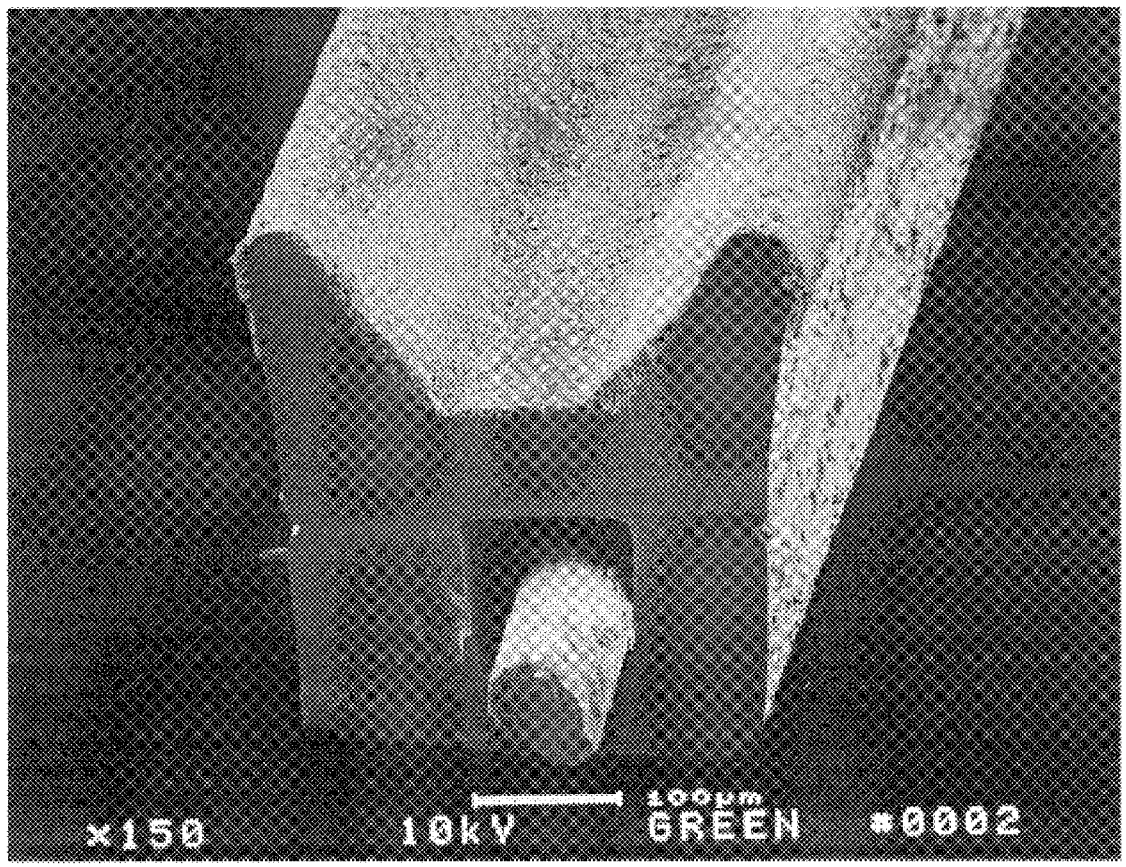
FIG. 17 illustrates a co-drawn wire electrode/fiber similar to that illustrated in FIG. 16 with the exception that the fiber has been coated with a phosphor material during the fiber draw process.

In one preferred embodiment for use especially in plasma emissive displays, the electrodes 14 are preferably located within the fibers 13, as illustrated in FIGS. 15 and 16. This can be accomplished, for example, by employing a fiber preform having an orifice therein, and inserting a wire electrode into the orifice while the fiber is being drawn by the redraw process illustrated in FIG. 8. An electronmicrograph of such a fiber is shown in FIG. 16. In addition, reflective coatings and/or phosphor materials could easily be applied during this redraw process, to result in a phosphor coated fiber, as illustrated in FIG. 17, enabling the fibers to be employed in color displays. For example, the fibers could be spray coated or otherwise coated either directly after the fiber redraw process or sometime thereafter prior to being arrayed onto the substrate. In one preferred embodiment, a separate fiber redraw source is utilized for each color phosphor, and the phosphors sprayed onto each of their corresponding fibers.

Fibers for the top plate should be made of high (e.g. >10) dielectric transparent glass such as lead based glasses. While the base channel fiber can be made from any non-conducting material, a preferred material is reflective opal glass. The electrodes 14 employed herein can be made from any metal material that can survive the draw conditions, such as, for example, W and Cu.

Because the present invention utilizes fibers to make the displays, and these fibers can be made to extremely long dimensions if desired, the present invention enables the formation of displays having dimensions which were heretofore unattainable using conventional display technology. For example, displays can be made which are much larger than conventional displays, or extremely long and thin compared to conventional displays. One potential application for such extremely long and thin displays is a display for an automobile dashboard which extends partially or entirely the length of a dashboard. If desired, the display could be curved so that from the top view the dashboard display would appear to be convexly curved. This could be accomplished, for example, using a curved glass substrate 24 and assembling any of the fibers described herein on the curved glass substrates. For example, curved glass substrates could be substituted in place of the flat curved glass substrates 24 illustrated in FIGS. 3A–3D, 4A–4D, 6A–6E and assembled, for example, using the method illustrated in FIG. 10.

The invention is further illustrated by the following examples, which are meant to be illustrative, and not in any way limiting, to the claimed invention.

EXAMPLE 1

Figure 13:
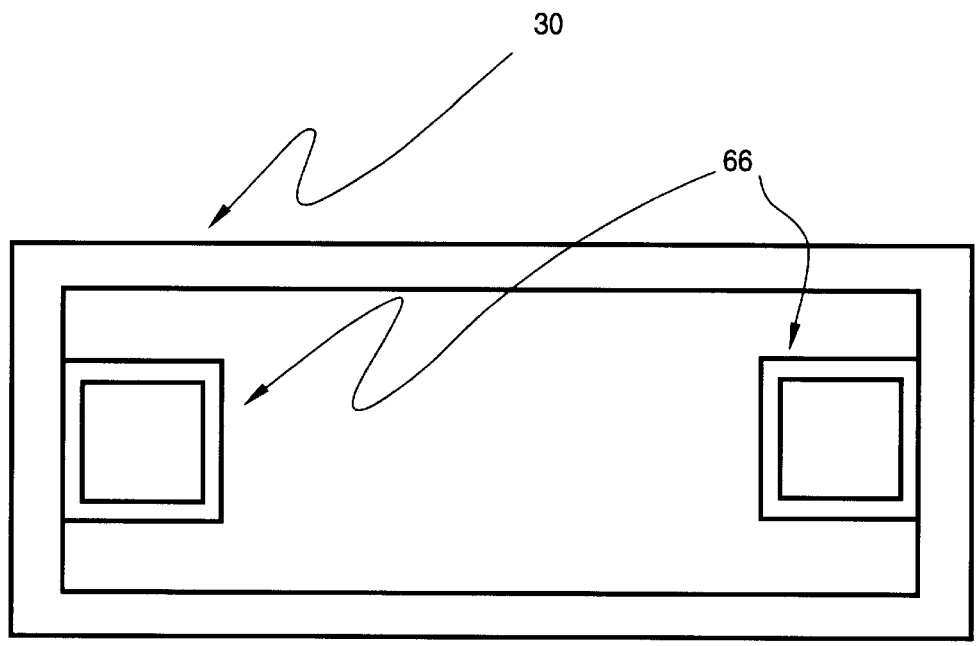
FIG. 13 illustrates a top view of a preferred fiber preform for use in the invention.
Figure 13:
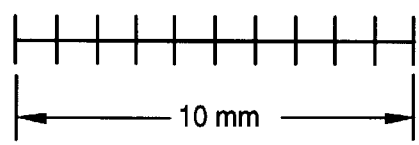

A glass preform 30 was assembled from R-0721 and S-103 borosilicate glass tubing, both purchased from Wale Apparatus, Hellertown, Pa., having the cross-sectional geometry illustrated in FIG. 13. This preform 30 employs glass tubes 60 to guide the wires 38. The tubes 66 are centered in the short sides of rectangular fiber preform 30, and is intended to ease manufacture, since a fiber cannot be included in the array in an incorrect orientation. As illustrated in FIG. 8, tungsten wire 38 of 0.003" diameter (Thermionic Products, North Plainfield, N.J.) was fed through the preform, thru the root of the draw, and drawn along with the glass of the fiber 13. The upper end of the preform 30 was affixed to a vacuum line connection so that the pressure on the inside could be slightly reduced (about one inch $H_2O$). Silicone rubber seals were used to allow the wire 38 to feed into the preform 30 while maintaining the pressure difference.

Wire-containing fiber was drawn at 2.04 m/min with a preform feed of 1.42 mm/min; the furnace temperature was 1054° C. The fiber was about 0.029"×0.012" outside dimensions, and was rather oval in cross section; the wall thickness was about 0.0012". Similar tubing with wall thicknesses of 0.0006" has been made and could be similarly used. A slightly lowered pressure within the preform has been found useful in maintaining a fiber cross section closer to the desired rectangular or square shape. In this example, the pressure within the fiber was maintained at about 1.5 to 2.5 inches of water column. The use of tension in the wires has also been found useful in some cases in maintaining the desired cross section. The preform could be formed so that it differs from square or rectangular in a way which causes it to correlate more closely to the desired cross section after draw. Also, dies, rollers, or similar devices could be employed in the draw furnace, or as an after treatment, to improve the shape of the fiber.

In order to fill the fibers with neon gas, both ends of lengths of the wire-containing fiber were first epoxied into pieces of copper tubing which in turn were mated to a vacuum/gas-handling system. These lengths of tubing were evacuated, then back-filled with about 50 Torr pressure of neon gas. A miniature NOX/butane torch was then used to flame seal both ends of the fibers, collapsing the glass around the wires and thereby trapping the reduced pressure neon. The neon-filled fiber was then cut between the seal and the epoxy on both ends for removal.

Five neon-filled fibers were laid-up on 0.015" thermoplastic urethane sheet (type X1439, Deerfield Urethane, South Deerfield, Mass.) on a piece of flat, Corning code 7059 glass in a jig. Other, unsealed fibers were added to form a parallel array about 3"×6". A temporary glass cover sheet was placed atop the array, then the assembly was laminated together in a vacuum oven at 115° C. overnight with a 1191-gm steel plate on top. It was then removed from the jig and placed on a flat steel plate; a total of 6000 gms of mass was put on top, and it was further heated to 123° C. overnight in a vacuum furnace. After these measures, the fiber array was laminated to the flat Corning Code 7059 sheet and presented an optically clear appearance. For ease of handling, the panel was then mounted on a piece of circuit board material from which the central portion had been removed, so that the panel was supported around the edges, but light could still pass through the middle. The surface of the panel and a piece of glass with a conducting indium-tin oxide (ITO) stripes were washed thoroughly, then coated with a solution of 2% polyvinyl alcohol (PVA). After the PVA layer had dried, it was buffed with velvet cloth to provide alignment for a liquid crystal layer. Two Mylar spacer strips about 12.5 micron thick were placed atop the panel, and the ITO-coated glass placed face down, with its buffing direction perpendicular to that of the fiber panel, to form a liquid crystal cell. The cell was held in place temporarily with binder clips while being filled with E7 liquid crystal containing 0.1 w/o ZLI 3786 anti-chiral agent (both from EM Industries, Hawthorne, N.Y.). The edges of the cell were then sealed with Miller-Stevens 407 epoxy. The completed cell was then placed on a light table on which a sheet of Polaroid polarizing plastic (Edmund Scientific, Barrington, N.J.) had been placed. A power supply was connected to the wires extending from the gas-filled fibers in such a manner that the two wires in each fiber were at opposite polarities. A second sheet of Polaroid was placed atop the cell, oriented with respect to the first sheet so that only minimal light was transmitted thru the display. The entire panel, except for defects where no LC had filled in, appeared dark. An ac voltage at 400 Hz was applied to the gas-filled fibers. At approximately 350 v, the neon plasma in the display ignited, and the transmission of the panel in the region of these lines increased, resulting in visible white lines across a black display. By orienting the polarizers to maximize transmission in the off state, black lines could be produced across the display when the plasma was on. The contrast ratio of the lines was found to be about 12:1.

EXAMPLE 2

Some 6" lengths of rectangular hollow fiber about 0.008"×0.027" containing two 0.003" tungsten wires were dyed red, green, or blue using laboratory marking pens. These were assembled into an array colored fibers, ordered ... RBGRBG ..., about 6"×1", and then laminated in a manner similar to that described in Example 1. The resulting array of fibers was laminated to the substrate, and retained the appropriate colors to provide the color filter function in a display.

EXAMPLE 3

An array about 3"×6" containing 10 neon-filled rectangular fibers was assembled and laminated to form a panel as described in EXAMPLE 1. The panel and a cover sheet with conducting ITO stripes were washed, then cleaned in an oxygen plasma cleaner. The panel and cover sheet were assembled with 0.001" thick mylar spacer strips to form a sandwich with a gap of 0.001" separating the tops of the fibers from the ITO stripes; the ITO stripes ran perpendicular to the fiber direction. A mixture of 20 weight percent ultraviolet curable polymer, type PN393, and 80 weight percent liquid crystal TL205, was prepared by mixing at room temperature. Both of these materials had been purchased from EM Industries, Hawthorne, N.Y. The 0.001" gap in the panel was filled with this mixture by capillary action, after which the panel was exposed to ultraviolet irradiation from several Sylvania F15T8-BL fluorescent bulbs at about 1" distance for 5–10 minutes. This caused the polymer to cure and the mixture phase separated, forming an opaque white scattering layer of so-called polymer-dispersed liquid crystal. A positive-going signal of 0.5 msec pulses at 4 msec intervals of about 700 volts amplitude was applied to the wire electrodes in the gas-filled fibers. This ignited a brief plasma discharge in the fibers on each cycle. An ac signal amplitude was increased to beyond about 125 volts peak-to-peak, the pixels defined by the crossings of the ITO stripes with the gas-filled fibers were observed to begin to transform from scattering to transparent. This transformation became progressively more complete as the ac signal amplitude was increased to 250 volts peak-to-peak, a limit set by the power supply. Similar results were obtained with ac frequencies from 50 Hz to 10 KHz. If the ac signal and the 700-volt signal were of similar frequencies, so that their beat frequency was a few Hertz or less, the pixels were observed to transform back and forth from scattering to transparent as the two signals moved in and out of phase. A black background was placed beneath the panel, and the panel was illuminated from the opposite surface to produce a display having black on white contrast.

EXAMPLE 4

A plasma display preform 30 similar to that illustrated in FIG. 16 was assembled from Corning Code 7740 Pyrex rod.

The geometry of the preform was designed as a U-shape channel fused on top of another thick walled U-shaped channel. The two pieces of Pyrex were fused together at 790° C. for 0.5 hr. A 0.003" diameter tungsten wire 38 was fed through the square opening of the preform 30 during the redraw process, which was similar to that shown in FIG. 8. The wire-containing fiber was drawn at 980° C. at a rate of 4.1 m/min with a preform down feed of 3.2 mm/min. The final plasma fiber dimensions were about 0.75 mm wide and 0.6 mm high. The plasma channel depth was 0.25 mm with a base width of 0.32 mm. The top of the U-shape channel tended to bow outward slightly. This widening of the top of the channel can either be compensated for during the initial preform design or dies/roller could be placed up in the furnace to hold the ends of the preform from bowing out.

After the wire-containing fibers were drawn the U-shape channels were coated with the following phosphors:

Blue: Barium Magnesium Aluminate:Europium activated,

Red: Yttrium Oxide:Europium activated,

Green: Zinc Orthosilicate:Manganese activated.

The phosphors were mixed with a nitrocellulose/amylacetate vehicle to a 50/50 portion by weight and applied to the fiber channels using an airbrush after the draw process. Nitrogen was used for the airbrush gas at a 15 psi pressure. The deposited phosphor thickness was about 15 microns. The coated RGB fiber channels were laid-up on a 4"×4"×1.1 mm Corning Code 1737 glass plate between two 1"×3"×0.7 mm 1737 glass spacers. The assemble was then heated to 250° C. for 30 minutes in air to burn out the binder solution. A top cover sheet was fabricated with interdigitated Mo electrodes. The electrode widths were 30, 50 and 100 microns and they were spaced on 250 to 800 micron centers. The Mo was sputtered onto a 1737 glass cover sheet to a thickness of 1 micron. Photolithography was used to produce the desired interdigitated pattern in photoresist and a mixture of nitric:sulfuric:water (1:1:3) was used to etch the Mo. A 0.7 microns thick atmospheric pressure CVD $SiO_2$ was deposited over the MO electrodes at 450° C. followed by an e-beam deposition of MgO to a thickness of about 0.2 micron. The top plate was annealed in air at 300° C. for 8 hours to densify the MgO layer.

Miller-Stephenson Epoxy 907 adhesive was used to seal the perimeter of the top plate to the base fiber channel plate and form a structure similar to that illustrated in FIG. 15. A 1.4 mm×0.7 mm hollow tube was inserted into the display to serve as a vacuum/gas fill port. The display was evacuated to 10 m Torr and then back filled with 10% Xe in He to 90 Torr. An ac voltage at 400 Hz was applied to two interdigitated surface electrodes. At approximately 380 volts a line of RGB dots were illuminated (when a plasma strikes, the Xe has a radiative decay that yields 147 nm UV radiation which is absorbed by the phosphor converted to the phosphor's primary color). It was also found that individual pixels could be lit by applying a voltage from the surface electrode to the wire drawn into the glass fiber. Applying an ac voltage across the surface electrodes yielded RGB colors that were easily viewed in ambient light. However, the amount of light escaping out the back of the display was almost as bright as the front. Therefore, to increase both the brightness and efficiency of the display the fiber channels should be drawn from a reflecting glass, such as an opal, or have a reflecting surface applied to the back of the channel.

EXAMPLE 5

Fiber channels with co-drawn wire electrodes were phosphor coated during the draw process. An airbrush was used to spray coat each of the phosphors listed in Example 4 into the fiber channels. An airbrush was placed midway between the bottom of the furnace and the draw rollers, about 1 inch away from the fiber. Aluminum foil was placed behind the fiber to collect the over spray. The fiber was drawn at a rate of about 2.75 m/min. The green phosphor, zinc orthosilicate:manganese activated, appeared to yield the most uniform coating, as shown in FIG. 17. The mean particle size of the phosphors was about 3 microns. The larger red (5 microns) and blue (10 microns) phosphors employed yielded less uniform coatings. Therefore, to achieve the most uniform coating via airbrush a particle size below about 5 microns is desired.

EXAMPLE 6

Fiber channels were drawn with co-drawn 0.002" copper wire. A draw rate of 3.2 m/min. with a preform down feed of 1.1 mm/min. was used. Because of cost reasons Cu wire is preferred over W wire. However, the tensile strength of Cu is much lower than W. Therefore, it was somewhat difficult to draw the Cu wire. The wire had to be continuously fed into the top of the preform. Also the Cu wire oxidizes in the hot zone, thus an inert atmosphere in the furnace is preferred.

EXAMPLE 7

A plasma display using fiber channels, similar to those illustrated in FIG. 16, was assembled. To increase the brightness of the display the fiber channels were drawn from Corning 61-0 opal glass. In the present example, the opal glass reflects most of the generated light that would otherwise escape out of the back of the display to the viewers eye. The U-shaped channels were coated with red, green and blue phosphors using an airbrush similar to that discussed in Example 4. The coated fibers were laid up on a soda lime glass plate that had a counter sunk hole for a subsequent vacuum tube. Ferro Corporation's EG 2045 VEG lead base glass frit was placed under and over the wire address electrodes and around the array of plasma channels. The lead base frit was mixed in a Nitrocellulose/Amylacetate solution 10:3 by weight. The top plate of the surface discharge AC plasma display was supplied by Electroplasma, Incorporated of Millbury, Ohio. The top plate was composed of interdigitated metal electrodes with a high dielectric glass frit coating. The top plate was cleaned with acetone then placed in an oxygen plasma and 200 W for 5 minutes. The top plate was then placed in an e-beam evaporator with a shadow mask delineating the subsequent 0.45 micron MgO deposition. After the MgO deposition the top plate was immediately placed over the bottom plate with the fiber channels and frit. A 0.25 inch vacuum tube was fritted to the back of the display and the whole assembly was placed in a furnace. The furnace was ramped to 300° C. and held for 8 hours to burn of most of the nitrocellulose/amylacetate and water. The temperature was then raised to 500° C. for a 1 hour hold to melt the frit and seal the display. The display was then evaluated while heated on a hot plate at 400° C. When a vacuum of $1 \times 10^{-7}$ Torr is reached, the display is back filled with a mixture of He, Ne and Xe and the 0.25 inch glass tube is sealed closed. Note that only one temperature firing cycle is needed for this display fabrication process.

During testing the display could be addressed from the top to the bottom electrodes and the display could be illuminated in the surface discharged mode with a voltage of 500 V.

Although the invention has been described in detail for the purpose of illustration, it is understood that such detail is solely for that purpose and variations can be made therein by those skilled in the art without departing from the spirit and scope of the invention which is defined by the following claims.

For example, while the embodiments illustrated in FIGS. 3A–3D and 4A–4D illustrate application of the rib/channel structures for PALC displays, such embodiments could also be employed in emissive displays (e.g. plasma displays), in which case the microsheet cover would be replaced with a cover sheet of glass having electrodes thereon which are arrayed orthogonal to the direction of the channels, as is known in the plasma emissive display art.

What is claimed is:

1. A method of making a barrier rib structure for use in an electronic information display, comprising:
    assembling a plurality of glass fibers to form a rib/channel structure suitable for use in said electronic display, said electronic display being a plasma addressed liquid crystal display.

2. The method of claim 1, further comprising, prior to said assembling step, forming said glass fibers by heating a glass preform and drawing said preform into smaller diameters to form said fibers.

3. The method of claim 2, wherein said forming step comprises drawing a preform to form a fiber having a cross-sectional shape selected from the group consisting of T-shaped, U-shaped, L-shaped, H-shaped, I-shaped, trapezoidal, rectangular, circular, triangular, or combinations thereof.

4. The method of claim 2, wherein said forming step comprises inserting an electrode material into said glass preform and forming an electrode-containing fiber during said drawing step.

5. The method of claim 4, wherein said fiber in said forming step comprises a rectangular cross-section, and said inserting said electrode material step comprises inserting said electrode material into one or more corners of said fiber.

6. The method of claim 5, wherein said fiber in said drawing step comprises a shape selected from the group consisting of T-shaped, U-shaped, L-shaped, H-shaped, I-shaped, trapezoidal, rectangular, circular, triangular, or combinations thereof, and said inserting said electrode material step comprises locating said electrode against or within at least one portion of said fiber.

7. The method of claim 2, wherein said drawing step comprises drawing a preform comprising a plurality of hollow channels therein to form a fiber having a plurality of channels therein, each channel having a rectangular cross-sectional shape.

8. The method of claim 1, wherein said assembling step comprises assembling said fibers on a substrate.

9. The method of claim 8, wherein said substrate is glass.

10. The method of claim 8, further comprising applying a cover plate over said rib/channel structure.

11. The method of claim 8, further comprising, prior to said assembling step, depositing an electrode material on said substrate.

12. The method of claim 11, wherein said electrode is selectively deposited on said substrate to form selectively deposited electrodes, and said assembling step comprises depositing said fibers on said selectively deposited electrodes.

13. A method of making a barrier rib structure for use in a plasma emissive display, comprising:
    assembling a plurality of glass fibers to form (a) a rib/channel structure and (b) a top plate electrode structure suitable for use in said display.

14. A method of making a barrier rib structure for use in an electronic information display, comprising in order:
    forming a plurality of glass fibers by heating a glass preform and drawing said preform into smaller diameters to form said fibers; and
    assembling said plurality of glass fibers to form a rib/channel structure suitable for use in said electronic display;
    wherein during or after said forming step, said fibers are coated with phosphor material.

15. A method of making a barrier rib structure for use in an electronic information display, comprising:
    assembling a plurality of glass fibers to form a rib/channel structure suitable for use in said electronic display wherein said fibers are formed so that they are capable of reflecting greater than 25 percent of visible light.

16. The method of claim 1, wherein at least portions of said fibers are sufficiently optically absorbing to function as a black matrix pattern.

17. The method of claim 1, wherein said assembling step comprises positioning a plurality of substrates on a rotatable drum,
    rotating said drum, and
    depositing said fibers onto said substrates as said drum rotates.

18. The method of claim 17, wherein said depositing step comprises wrapping said fiber in a continuous strand over said substrates.

19. The method of claim 1, wherein said fibers comprise colored glass.

20. The method of claim 1, further comprising, prior to or after said assembling step, applying a coating to said fibers which imparts color to said fibers.

21. A method of making a barrier rib structure for use in an electronic information display, comprising:
    assembling a plurality of glass fibers to form a rib/channel structure suitable for use in said electronic display; and
    prior to or after said assembling step, applying a coating to said fibers which increases the reflectivity of the fibers.

22. A method of making a barrier rib structure for use in an electronic information display, comprising:
    assembling a plurality of glass fibers to form a rib/channel structure suitable for use in said electronic display; and
    prior to or after said assembling step, coating said channels with at least one phosphor.

23. A method of making a barrier rib structure for use in an electronic information display, comprising in order:
    selectively depositing an electrode material on a substrate to form selectively deposited electrodes; and
    assembling a plurality of glass fibers on the substrate to form a rib/channel structure suitable for use in said electronic display, said assembling comprising depositing said fibers on said selectively deposited electrodes.

24. A method of making a barrier rib structure for use in an electronic information display, comprising in order:
    forming a plurality of glass fibers by heating a glass preform having a rectangular cross-section and drawing said preform into a smaller cross-section to form said fibers; and
    assembling said plurality of glass fibers to form a rib/channel structure suitable for use in said electronic display;
    wherein said forming step comprises inserting an electrode material into one or more corners of said glass preform and forming an electrode-containing fiber during said drawing step.

25. A method of making a barrier rib structure for use in an electronic information display, comprising:

assembling a plurality of glass fibers to form a rib/channel structure suitable for use in said electronic display wherein at least portions of said fibers are sufficiently optically absorbing to function as a black matrix pattern.

26. A method of making a barrier rib structure for use in an electronic information display, comprising:

assembling a plurality of glass fibers to form a rib/channel structure suitable for use in said electronic display wherein said fibers comprise colored glass.

27. A method of making a barrier rib structure for use in an electronic information display, comprising:

assembling a plurality of glass fibers to form a rib/channel structure suitable for use in said electronic display; and prior to or after said assembling step, applying a coating to said fibers which imparts color to said fibers.

28. A method of making a barrier rib structure for use in an electronic information display, comprising in order:

forming a plurality of glass fibers by heating a glass preform and drawing said preform into smaller diameters to form said fibers; and assembling said plurality of glass fibers to form a rib/channel structure suitable for use in said electronic display;

wherein said forming step comprises drawing said preform to form a fiber having a cross-sectional shape selected from the group consisting of T-shaped, U-shaped, L-shaped, H-shaped, I-shaped, trapezoidal, triangular, or combinations thereof.

29. A method of making a barrier rib structure for use in an electronic information display, comprising in order:

forming a plurality of glass fibers by heating a glass preform and drawing said preform into smaller diameters to form said fibers; and assembling said plurality of glass fibers to form a rib/channel structure suitable for use in said electronic display;

wherein:
(a) said forming step comprises inserting an electrode material into said glass preform and forming an electrode-containing fiber during said drawing step,
(b) the shape of the fiber produced in said forming step is selected from the group consisting of T-shaped, U-shaped, L-shaped, H-shaped, I-shaped, trapezoidal, triangular, or combinations thereof, and
(c) said inserting said electrode material step comprises locating said electrode against or within at least one portion of said fiber.

30. A method of making a barrier rib structure for use in an electronic information display, comprising in order:

forming a plurality of glass fibers by heating a glass preform and drawing said preform into smaller diameters to form said fibers; and assembling said plurality of glass fibers to form a rib/channel structure suitable for use in said electronic display;

wherein said drawing step comprises drawing a preform comprising a plurality of hollow channels therein to form a fiber having a plurality of channels therein, each channel having a rectangular cross-sectional shape and being closed along its cross-sectional perimeter.

31. A method of making a barrier rib structure for use in an electronic information display, comprising:

assembling a plurality of glass fibers to form a rib/channel structure suitable for use in said electronic display, said assembling comprising:

positioning a plurality of substrates on a rotatable drum, rotating said drum, and depositing said fibers onto said substrates as said drum rotates.

32. The method of claim 31, wherein said depositing step comprises wrapping said fiber in a continuous strand over said substrates.

33. A structure for use in an electronic display, comprising:

a plurality of small diameter glass fibers assembled into a rib/channel structure suitable for use in an electronic display, said electronic display being a plasma addressed liquid crystal display.

34. The structure of claim 33, wherein said glass fibers are assembled on a substrate.

35. The structure of claim 34, further comprising an electrode material on said substrate.

36. The structure of claim 33, wherein said fibers comprise electrode-containing fibers.

37. The structure of claim 36, wherein said fibers are rectangular cross-section, and said electrodes are located in adjacent corners of said fiber.

38. The structure of claim 36, wherein said fiber has a cross section which comprises a T-shaped, U-shaped, H-shaped or I-shaped, trapezoidal, rectangular, circular, triangular, or combinations thereof, and said electrode material is located against or within at least one portion of said fiber.

39. The structure of claim 33, wherein said ribs in said fibers are sufficiently optically absorbing to function as a black matrix pattern.

40. The structure of claim 33, wherein said fibers have a cross-sectional shape selected from the group consisting of T-shaped, U-shaped, L-shaped, H-shaped, I-shaped, trapezoidal, rectangular, circular, triangular, or combinations thereof.

41. The structure of claim 33, further comprising a cover over said rib/channel structure.

42. The structure of claim 33, further comprising a planarizing layer over said rib/channel structure.

43. A structure for use in a plasma emissive display, comprising:

a plurality of small diameter glass fibers assembled into (a) a rib/channel structure and (b) a top plate electrode structure for use in said display.

44. A structure for use in an electronic display, comprising:

a plurality of small diameter glass fibers assembled into a rib/channel structure suitable for use in an electronic display; and a planarizing layer over said rib/channel structure.

45. A structure for use in an electronic display, comprising:

a plurality of small diameter, electrode-containing, glass fibers assembled into a rib/channel structure suitable for use in an electronic display;

wherein said fibers have rectangular cross-sections and said electrodes are located in adjacent corners of said fibers.

46. A structure for use in an electronic display, comprising:

a plurality of small diameter glass fibers assembled into a rib/channel structure suitable for use in an electronic display;

wherein the ribs formed by said fibers are sufficiently optically absorbing to function as a black matrix pattern.

47. A structure for use in an electronic display, comprising:

a plurality of small diameter glass fibers assembled into a rib/channel structure suitable for use in an electronic display wherein said fibers have a cross-sectional shape selected from the group consisting of T-shaped, U-shaped, L-shaped, H-shaped, I-shaped, trapezoidal, triangular, or combinations thereof.

48. A structure for use in an electronic display, comprising:

a plurality of small diameter glass fibers assembled into a rib/channel structure suitable for use in an electronic display wherein:
said fibers comprise electrode-containing fibers,
said fibers have a cross-sectional shape selected from the group consisting of T-shaped, U-shaped, L-shaped, H-shaped, I-shaped, trapezoidal, triangular, or combinations thereof, and
said electrode material is located against or within at least one portion of said fiber.

* * * * *